(12) United States Patent
Burton (10) Patent No.: US 10,297,079 B2
(45) Date of Patent: May 21, 2019

(54) SYSTEMS AND METHODS FOR PROVIDING A COMBINED VISUALIZABLE REPRESENTATION FOR EVALUATING A TARGET OBJECT

(71) Applicant: Toyota Motor Engineering & Manufacturing North America, Inc., Erlanger, KY (US)

(72) Inventor: Aaron Burton, Fort Wright, KY (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 377 days.

(21) Appl. No.: 15/214,495

(22) Filed: Jul. 20, 2016

(65) Prior Publication Data

US 2018/0025484 A1 Jan. 25, 2018

(51) Int. Cl.
*G01B 7/00* (2006.01)
*G06T 17/20* (2006.01)
(Continued)

(52) U.S. Cl.
CPC .......... *G06T 17/205* (2013.01); *G06T 7/0004* (2013.01); *G06T 7/70* (2017.01);
(Continued)

(58) Field of Classification Search
None
See application file for complete search history.

(56) References Cited

U.S. PATENT DOCUMENTS

| 7,215,430 B2 | 5/2007 | Kacryra et al. |
| 8,254,664 B2 * | 8/2012 | Chang .................... G01B 11/24 382/141 |

(Continued)

FOREIGN PATENT DOCUMENTS

| CN | 102081693 | 1/2013 |
| CN | 103630082 | 3/2014 |

OTHER PUBLICATIONS

Liang, Xihne "Study on optical measurement technology for automotive covering parts", www.atlantis-press.com/php/download paper.php?id=25840148 Access/Published: 2015; Journal: 5th International Conference on Advanced Design and Manufacturing Engineering (ICADME 2015).

*Primary Examiner* — Aditya S Bhat
(74) *Attorney, Agent, or Firm* — Dinsmore & Shohl, LLP (57) ABSTRACT

Systems and methods of providing a combined visualizable representation for evaluating dimensions of a target object are disclosed. A method includes generating a mesh having a plurality of nodes and corresponding to one or more measurements for a target object, overlaying the mesh on a nominal object created from reference data representative of one or more expected dimensions of the target object, and evaluating each node for a plurality of criteria to obtain a plurality of criteria values. Each criterion is an expression of an amount of error between each node and a corresponding point on the nominal object. The method further includes assigning a weighted value to each criteria value to obtain weighted criteria values, generating a visualizable representation of each weighted criteria value to obtain visualizable representations, and combining each visualizable representation into a combined visualizable representation that indicates each one of the weighted criteria values.

18 Claims, 5 Drawing Sheets

(51) Int. Cl.
*H04N 1/00* (2006.01)
*G06T 7/00* (2017.01)
*G06T 7/70* (2017.01)
*G06T 7/90* (2017.01)

(52) U.S. Cl.
CPC ........... *G06T 7/90* (2017.01); *H04N 1/00827* (2013.01); *G06T 2207/10028* (2013.01); *G06T 2207/30164* (2013.01)

(56) References Cited

U.S. PATENT DOCUMENTS

| | | |
|---|---|---|
| 8,254,723 B2 | 8/2012 | Chang et al. |
| 2004/0051711 A1* | 3/2004 | Dimsdale ............ G01B 11/002 345/419 |
| 2015/0009214 A1 | 1/2015 | Lee et al. |
| 2018/0330473 A1* | 11/2018 | Foi .......................... G06T 7/337 |

* cited by examiner

SYSTEMS AND METHODS FOR PROVIDING A COMBINED VISUALIZABLE REPRESENTATION FOR EVALUATING A TARGET OBJECT

TECHNICAL FIELD

The present specification generally relates systems and methods for ensuring an appropriate construction and/or alignment of a manufactured part and, more specifically, to systems and methods for evaluating deviations between the dimensional aspects of a manufactured part with corresponding reference data for the purposes of determining appropriate corrective measures.

BACKGROUND

Certain manufactured parts, particularly parts having visible surfaces ("class A surfaces"), must be particularly constructed and appropriately aligned with adjacent objects, such as other manufactured parts, to ensure appropriate fit, an aesthetically pleasing look, proper function, and/or the like. Improper construction of the manufactured part and/or misalignment thereof can be detected. That is, certain deviations from a nominal construction and/or alignment can be determined. However, to ensure an appropriate corrective measure is undertaken (e.g., reconstruction of the manufactured part or portion thereof, realignment of the manufactured part, etc.), it is necessary to appropriately evaluate the detected deviations to determine their relative importance such that an appropriate action can be taken.

Accordingly, a need exists for systems and methods that construct a visualizable representation of the detected deviations of a manufactured part from a nominal construction, and further indicate the relative severity and importance of the deviations with respect to one another.

SUMMARY

In one embodiment, a method of providing a combined visualizable representation for evaluating a target object includes generating, by a processing device, a mesh having a plurality of nodes and corresponding to one or more measurements for the target object, overlaying, by the processing device, the mesh on a nominal object created from reference data that is representative of one or more expected dimensions of the target object, and evaluating, by the processing device, each node of the plurality of nodes for a plurality of criteria to obtain a plurality of criteria values. Each criterion of the plurality of criteria is an expression of an amount of error between each node and a corresponding point on the nominal object. The method further includes assigning, by the processing device, a weighted value to each of the plurality of criteria values to obtain a plurality of weighted criteria values, generating, by the processing device, a visualizable representation of each weighted criteria value of the plurality of weighted criteria values to obtain a plurality of visualizable representations, and combining, by the processing device, each visualizable representation of the plurality of visualizable representations into the combined visualizable representation. The combined visualizable representation indicates each one of the plurality of weighted criteria values.

In another embodiment, a system of providing a combined visualizable representation for evaluating a target object includes a processing device and a non-transitory, processor-readable storage medium. The non-transitory, processor-readable storage medium includes one or more programming instructions that, when executed, cause the processing device to generate a mesh having a plurality of nodes and corresponding to one or more measurements for the target object, overlay the mesh on a nominal object created from reference data that is representative of one or more expected dimensions of the target object, and evaluate each node of the plurality of nodes for a plurality of criteria to obtain a plurality of criteria values. Each criterion of the plurality of criteria is an expression of an amount of error between each node and a corresponding point on the nominal object. The non-transitory, processor-readable storage medium further includes one or more programming instructions that, when executed, cause the processing device to assign a weighted value to each of the plurality of criteria values to obtain a plurality of weighted criteria values, generate a visualizable representation of each weighted criteria value of the plurality of weighted criteria values to obtain a plurality of visualizable representations, and combine each visualizable representation of the plurality of visualizable representations into the combined visualizable representation. The combined visualizable representation indicates each one of the plurality of weighted criteria values.

In yet another embodiment, a system of providing a combined color map for evaluating a target object includes a measuring device, a processing device communicatively coupled to the measuring device, and a non-transitory, processor-readable storage medium. The non-transitory, processor-readable storage medium includes one or more programming instructions that, when executed, cause the processing device to direct the measuring device to obtain one or more measurements for the target object, generate a mesh having a plurality of nodes and corresponding to the one or more measurements for the target object, receive reference data representative of one or more expected dimensions of the target object, generate a nominal object from the reference data, overlay the mesh on the nominal object, and evaluate each node of the plurality of nodes for a plurality of criteria to obtain a plurality of criteria values. Each criterion of the plurality of criteria is an expression of an amount of error between each node and a corresponding point on the nominal object. The non-transitory, processor-readable storage medium further includes one or more programming instructions that, when executed, cause the processing device to assign a weighted value to each of the plurality of criteria values to obtain a plurality of weighted criteria values, generate a color map of each weighted criteria value of the plurality of weighted criteria values to obtain a plurality of color maps, and combine each color map of the plurality of color maps into the combined color map. The combined color map indicates each one of the plurality of weighted criteria values.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein are generally directed to systems and methods for obtaining one or more measurements of a target object (such as a manufactured part or the like), generating a mesh from the measurements that is overlaid on a nominal object generated from reference data for the target object (e.g., computer aided design (CAD) data used to manufacture the target object), evaluating each node in the mesh with the corresponding point on the nominal object for errors according to certain criteria, generating a visualizable representation (e.g., a color map) for each criteria and weighting the visualizable representations, and generating a combined visualizable representation (e.g., a combined color map) from the weighted individual visualizable representation for the purposes of determining an extent and importance of deviations of the target object from the nominal object. The various criteria indicate certain types of errors that may exist, as well as the extent of the error. In addition, the weighting allows the criteria to be ranked based on order of importance. As a result, the combined visualizable representation indicates areas of the imaged target object where error has been detected and is deemed more important than other areas that also contain detected errors. As such, an observer can easily determine which areas to focus modification of the target object to ensure appropriate fit and which areas do not need or are less likely to need modification. In addition, the combined visualizable representation may also be used to indicate how a change in one area of the target object may affect the change in another area of the target object.

As used herein, a "point cloud" is a set of points or vertices in a three dimensional (3D) coordinate system. Such vertices may be defined by x, y, and z coordinates, and can represent the external surface of a target object, such as a manufactured part or the like. 3D point clouds or models can be generated or constructed using any technique now known or later developed. In a nonlimiting example, a point cloud may be created by 3D scanners, including laser-based scanners, LIDAR systems, and/or the like. In another nonlimiting example, a point cloud may be created via stereo imaging, where multiple images of a scene are used to construct pixel or point-based depth maps of scenes or objects in a scene. In general, 3D scanners process objects to identify large numbers of surface points on the object to produce a 3D point cloud representing the object surface.

As used herein, a "mesh" is collection of vertices, edges, and faces that define the shape of an object in 3D computer graphics and solid modeling. The mesh may be a polygon mesh or a triangle mesh. The mesh may be used by computer software programs and hardware devices by completing mapping operations on the vertices at the corners of shapes used for the mesh (e.g., triangles). For the purposes of the present disclosure, the mesh may be generated from a point cloud, as the point cloud by itself may not be usable by computer software programs and hardware devices for the purposes of determining a curvature of a surface.

A "color map" as used herein refers to a graphical representation of error values (e.g., amounts of error between a measured target object and reference data for that target object based on certain criteria) as colors or gray scale levels. The color map is merely an example of any visualizable representation that can be used to convey a graphical representation of error values. As such, the terms "color map" and "visualizable representation" may be used interchangeably herein. "Coloring" refers to assigning colors or gray scale values to particular error values. In a nonlimiting example, the distribution of error between a measured target object and reference data for that target object may be displayed in a gray scale where areas having the highest amount of error (e.g., relative to all areas or above a particular threshold) are displayed as black areas and areas having no error (or error below an acceptable threshold amount) are displayed as white areas. Linear interpolation may be performed using the highest amount of error and no error values such that a given amount of error is displayed in a gray scale.

Figure 1:
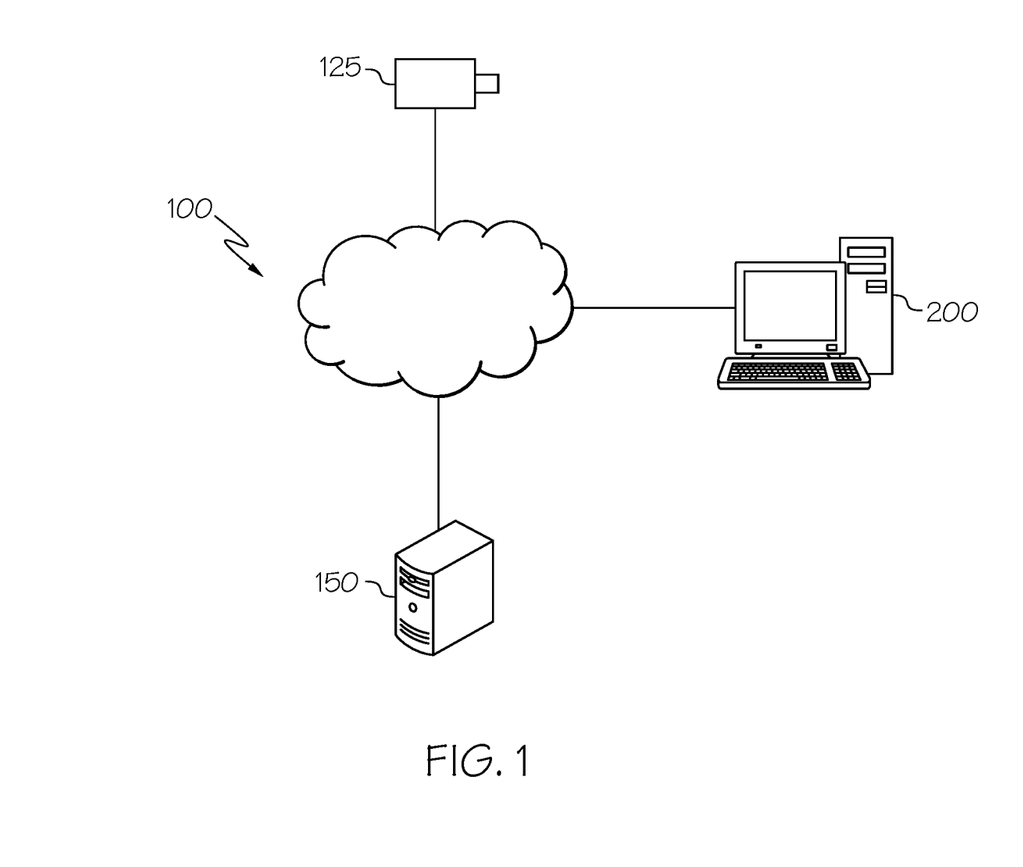
FIG. 1 schematically depicts an illustrative computing network for a system to detect and evaluate deviations of a target object with respect to reference data according to one or more embodiments shown and described herein.

FIG. 1 depicts an illustrative computing network that depicts components for a system that evaluates a manufactured part, according to embodiments shown and described herein. As illustrated in FIG. 1, a computer network 100 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 100 may generally be configured to electronically connect one or more computing devices and/or components thereof, and/or one or more imaging devices. Illustrative computing devices may include, but are not limited to, a user computing device 200 and a server computing device 150. An illustrative imaging device may include, but is not limited to, an imaging device 125 configured to capture one or more images and/or measurements of an object, such as a manufactured part, as described in greater detail herein. In some embodiments, the user computing device 200 and the imaging device 125 may be separate devices or may be integrated into a single device.

The imaging device 125 is not limited by this disclosure, and may each generally be any device that captures images, captures image-related data (e.g., raw scan data), obtains measurements, generates a point cloud, and/or transmits image, measurement, and/or point cloud related data. In some embodiments, the imaging device 125 may be an imaging device that is specifically configured for obtaining measurements (e.g., a measuring device). One nonlimiting example of a measuring device may be an optical measuring device that produces pulsed light directed at the target object and measures the amount of light that is reflected off the target object to determine the dimensional aspects of the target object. In some embodiment, the imaging device 125 may be a 3D scanner, including a laser-based scanner, a LIDAR system, and/or the like. In some embodiments, the imaging device 125 may be a camera, a camcorder, or the like, and may incorporate one or more image sensors, one or more image processors, one or more optical elements, and/or the like. The imaging device 125 may be capable of zooming in and out and may further be capable of moving, such as, for example, panning, tilting, moving along a guide, and/or the like. In other embodiments, the imaging device 125 may be a non-optical imaging device, such as a device that obtains measurements via non-optical means. A nonlimiting example of a non-optical device may be a device that obtains measurements via sonar technology.

While a single imaging device 125 is depicted herein, the number of imaging devices is not limited by this disclosure and may generally be any number of imaging devices. For example, a plurality of imaging devices may be used to capture various angles of a target object, such as a manufactured part. In another example, a single imaging device 125 may be used to capture various angles of a target object by moving relative to the target object.

In various embodiments, the imaging device 125 may be positioned adjacent to a target object to be imaged, such as a manufactured part or the like. The imaging device 125 may generally be positioned such that a field of view of the imaging device 125 captures at least a portion of the target object. For example, in embodiments where a plurality of imaging devices are used, each of the plurality of imaging devices may have its own optical axis. In addition, each individual imaging device 125 is oriented such that each respective optical axis is at a different angle relative to the target object. In another example, in embodiments where a single imaging device 125 is used, the imaging device 125 may have an optical axis and movement (e.g., rotation) of the imaging device 125 causes the optical axis to continuously reorient at a plurality of different angles relative to the target object.

The imaging device 125 may be mounted to any stationary or moving apparatus that provides the imaging device 125 with the capability of imaging the target object as described herein. For example, the imaging device 125 may be coupled to an arm or other support that allows the imaging device 125 to move about an axis around the target object such that the imaging device 125 can capture any angle of the target object. In some embodiments, movement of the imaging device 125 may be remotely controlled by a user.

The user computing device 200 may generally be used as an interface between a user the other components connected to the computer network 100, and/or various other components communicatively coupled to the user computing device 200 (such as components communicatively coupled via one or more networks to the user computing device 200), whether or not specifically described herein. Thus, the user computing device 200 may be used to perform one or more user-facing functions, such as receiving one or more inputs from a user or providing information to the user. Additionally, in the event that the server computing device 150 requires oversight, updating, or correction, the user computing device 200 may be configured to provide the desired oversight, updating, and/or correction. The user computing device 200 may also be used to input additional data into a data storage portion of the server computing device 150.

The server computing device 150 may receive electronic data and/or the like from one or more sources (e.g., the imaging device 125, the user computing device 200, and/or one or more databases), direct operation of one or more other devices (e.g., the imaging device 125), generate a point cloud and/or a mesh of an imaged object, determine an amount of error between an actual measurement and an expected measurement, and/or generate a color map. In some embodiments, the server computing device 150 may direct the imaging device 125 to move relative to a target object, direct the imaging device 125 to zoom in or out on a target object, and/or direct the imaging device 125 to capture one or more images of a target object, as described in greater detail herein.

It should be understood that while the user computing device 200 is depicted as a personal computer and the server computing device 150 is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing device 200 and the server computing device 150 may represent a plurality of computers, servers, databases, components, and/or the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 2A:
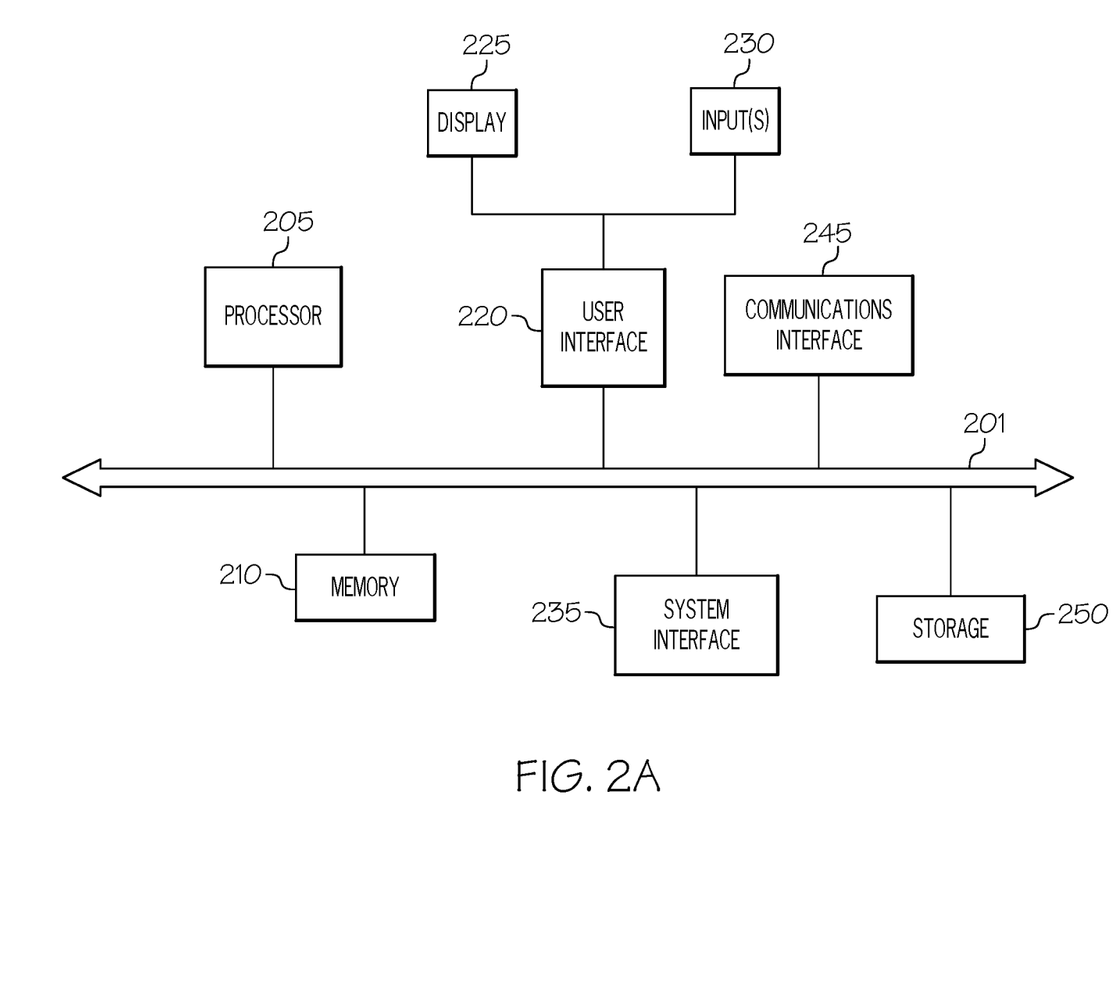
FIG. 2A schematically depicts a block diagram of illustrative hardware of a computing device that is used to detect and evaluate deviations of a target object with respect to reference data according to one or more embodiments shown and described herein.

Illustrative hardware components of the user computing device 200 and/or the server computing device 150 are depicted in FIG. 2A. A bus 201 may interconnect the various components. A processing device 205, such as a computer processing unit (CPU), may be the central processing unit of the computing device, performing calculations and logic operations required to execute a program. The processing device 205, alone or in conjunction with one or more of the other elements disclosed in FIG. 2A, is an illustrative processing device, computing device, processor, or combination thereof, as such terms are used within this disclosure. Memory 210, such as read only memory (ROM) and random access memory (RAM), may constitute an illustrative memory device (i.e., a non-transitory processor-readable storage medium). Such memory 210 may include one or more programming instructions thereon that, when executed by the processing device 205, cause the processing device 205 to complete various processes, such as the processes described herein. Optionally, the program instructions may be stored on a tangible computer-readable medium such as a compact disc, a digital disk, flash memory, a memory card, a USB drive, an optical disc storage medium, such as a Blu-ray™ disc, and/or other non-transitory processor-readable storage media.

Figure 2B:
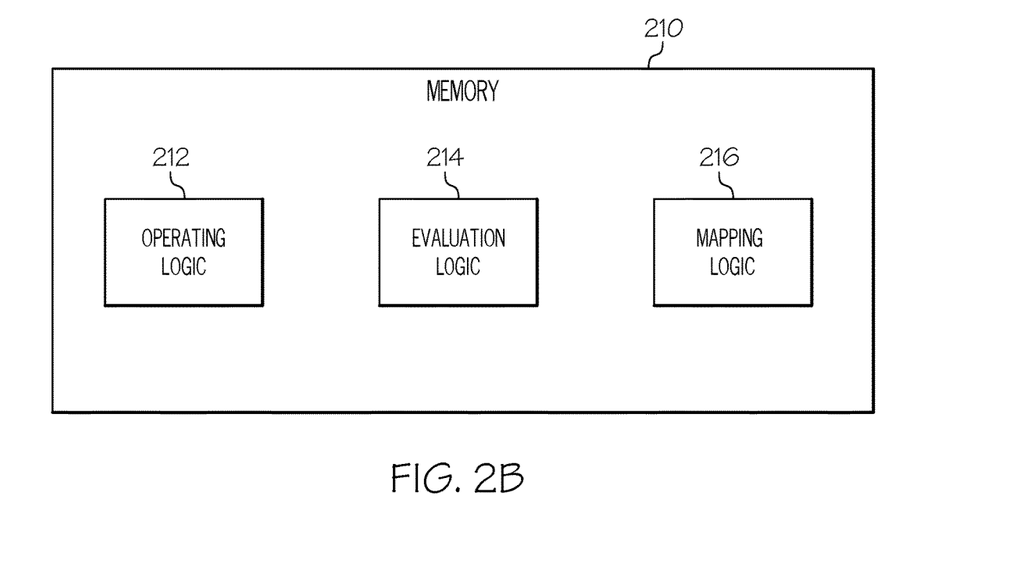
FIG. 2B schematically depicts a block diagram of software modules contained within a memory of a computing device that is used to detect and evaluate deviations of a target object with respect to reference data according to one or more embodiments shown and described herein.

In some embodiments, the program instructions contained on the memory 210 may be embodied as a plurality of software modules, where each module provides programming instructions for completing one or more tasks. For example, as shown in FIG. 2B, the memory 210 may contain operating logic 212, evaluation logic 214, and/or mapping logic 216. The operating logic 212 may include an operating system and/or other software for managing components of a computing device. The evaluation logic 214 may include one or more software modules for obtaining one or more images of a target object and/or reference data and/or generating a visualizable representation, such as an color map or the like. The mapping logic 316 may include one or more software modules for evaluating an imaged manufactured part, generating a point cloud and/or a mesh from the one or more images and/or the reference data, comparing slopes and/or distances between various points on an imaged manufactured part with a nominal shape obtained from reference data, determining errors and/or deviations between a target object and reference data, and/or weighting errors and/or deviations.

Referring again to FIG. 2A, a storage device 250, which may generally be a storage medium that is separate from the memory 210, may contain one or more data repositories for storing data that is used for evaluating a manufactured part and/or determining a manufactured part transformation. The storage device 250 may be any physical storage medium, including, but not limited to, a hard disk drive (HDD), memory, removable storage, and/or the like. While the storage device 250 is depicted as a local device, it should be understood that the storage device 250 may be a remote storage device, such as, for example, a server computing device or the like.

Figure 2C:
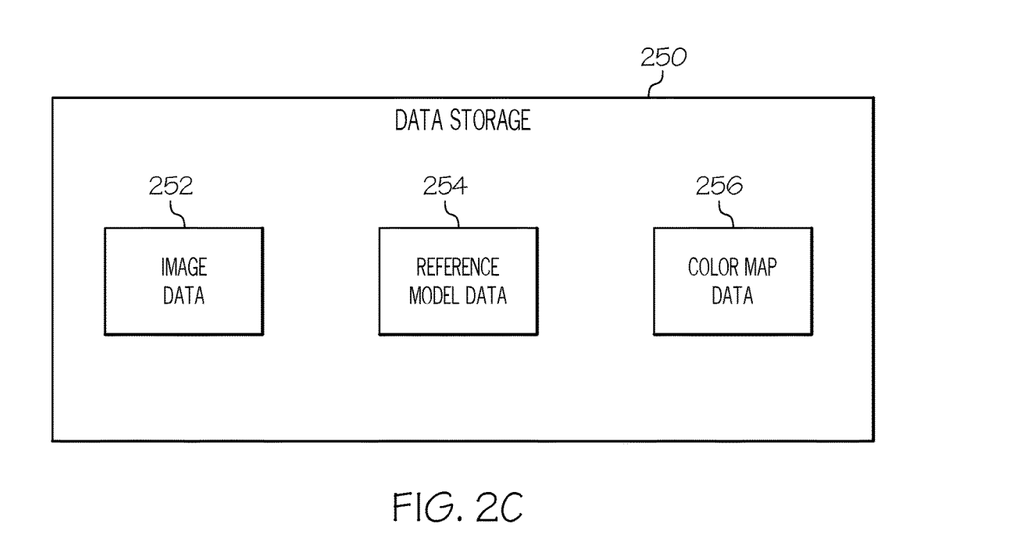
FIG. 2C schematically depicts a block diagram of various data contained within a data storage component of a computing device that is used to detect and evaluate deviations of a target object with respect to reference data according to one or more embodiments shown and described herein.

Illustrative data that may be contained within the storage device 250 is depicted in FIG. 2C. As shown in FIG. 2C, the storage device 250 may include, for example, image data 252, reference model data 254, and/or color map data 256. Image data 252 may include, for example, images that are collected of a target object (e.g., a manufactured part) and are subsequently used for evaluation, and/or the like. Reference model data 254 may include, for example, data relating to a nominal object, including a shape of the nominal object, a curvature of the nominal object at one or more locations, and/or the like. The data may be any type of reference data, such as CAD data or the like. Color map data 256 may include, for example, data generated as the result of evaluating error between a target object and reference data, which includes color maps and any other type of visualizable representation, as described in greater detail herein.

Referring again to FIG. 2A, an optional user interface 220 may permit information from the bus 201 to be displayed on a display 225 portion of the computing device in audio, visual, graphic, or alphanumeric format. Moreover, the user interface 220 may also include one or more inputs 230 that allow for transmission to and receipt of data from input devices such as a keyboard, a mouse, a joystick, a touch screen, a remote control, a pointing device, a video input device, an audio input device, a haptic feedback device, and/or the like. Such a user interface 220 may be used, for example, to allow a user to interact with the computing device or any component thereof.

A system interface 235 may generally provide the computing device with an ability to interface with one or more of the components of the computer network 100 (FIG. 1), such as, for example, the imaging device 125. Communication with such components may occur using various communication ports (not shown). An illustrative communication port may be attached to a communications network, such as the Internet, an intranet, a local network, a direct connection, and/or the like.

A communications interface 245 may generally provide the computing device with an ability to interface with one or more external components, such as, for example, an external computing device, a remote server, and/or the like. Communication with external devices may occur using various communication ports (not shown). An illustrative communication port may be attached to a communications network, such as the Internet, an intranet, a local network, a direct connection, and/or the like.

It should be understood that the components illustrated in FIGS. 2A-2C are merely illustrative and are not intended to limit the scope of this disclosure. More specifically, while the components in FIGS. 2A-2C are illustrated as residing within the server computing device 150 or the user computing device 200, these are nonlimiting examples. In some embodiments, one or more of the components may reside external to the server computing device 150 and/or the user computing device 200. Similarly, one or more of the components may be embodied in other computing devices not specifically described herein.

Figure 3:
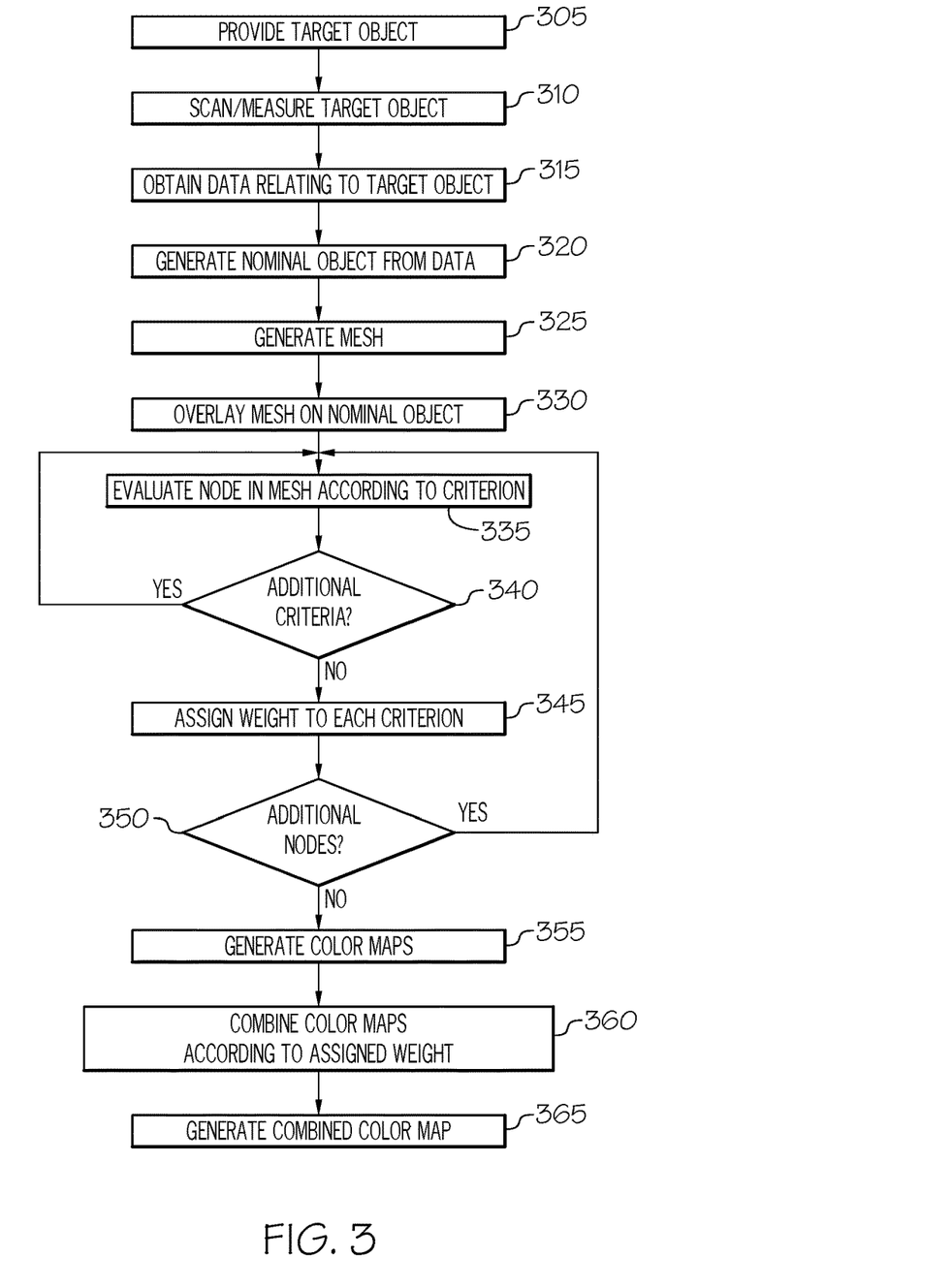
FIG. 3 depicts a flow diagram of an illustrative method of evaluating measurement data with reference data according to one or more embodiments shown and described herein.

Referring now to FIG. 3, a method of evaluating a target object, such as a manufactured part, is described. At step 305, the target object to be imaged is provided. For example, a manufactured part having at least one class A surface and/or a manufactured part that is to be installed adjacent to one or more objects, such as a body panel, a dashboard panel, or the like, may be provided in accordance with step 305. Other target objects that may be provided should generally be understood.

At step 310, the provided target object may be scanned and/or measured. That is, an imaging device or the like may be directed to obtain one or more images of the target object or may be directed to obtain one or more measurements of the target object. For example, certain imaging devices may obtain a plurality of images, which are then measured to determine the one or more dimensions of the target object. In another example, certain imaging devices (such as optical measuring devices or the like) may be directed to pulse a laser and receive reflected light, which, in turn, provides measurement data corresponding to the one or more dimensions of the target object. In yet another example, certain imaging devices may be directed to propagate sound signals and receive reflected signals, which, in turn, provide measurement data corresponding to the one or more dimensions of the target object.

As a part of the measuring according to step 310, a point cloud of the target object may be generated. That is, the data from the images/measurements is used to plot a plurality of points/vertices representing the surface of the target object in 3D space. In some embodiments, the point cloud may be generated by the imaging device (such as a laser based scanner, a LIDAR system, and/or the like) and transmitted to an external processing device for the purposes of generating a mesh, as described herein. In other embodiments, the point cloud may be generated by a processing device upon receiving image and/or measurement data from an imaging device, such as by translating the image and/or measurement data into point cloud data. In some embodiments, generating a point cloud may further include storing point cloud data in a data storage device, such as the data storage devices described herein. The point cloud data may be stored as a point cloud data file, for example.

At step 315, data relating to the target object (i.e., reference data) is obtained/received. The reference data may be obtained via data transfer from a data repository, such as one of the data repositories described herein. In some embodiments, the reference data that is obtained may be the same reference data that is used to construct the target object (e.g., the manufactured part). That is, the reference data that is obtained in accordance with step 315 contains the exact specifications that are used to construct the target object and thus represent desired specifications of the target object. In some embodiments, the reference data may include an electronically constructed nominal object, which is a virtual rendering of how the target object should appear, including curvature of the one or more surfaces thereof, particularly any class A surfaces. In other embodiments, the nominal object may be generated from the reference data at step 320. Generating the nominal object includes creating a virtual rendering of the nominal object from the reference data that is obtained. Certain software programs that are capable of generating such a virtual rendering should be understood and are not described in greater detail herein.

In some embodiments, the processes described herein may be completed only to evaluate the nominal object in order to identify and visualize areas of the nominal object that are likely to have accuracy issues. In such embodiments, it should be understood that steps 305, 310, and 315 may be omitted and the process described with respect to FIG. 3 may begin at step 320 in generating/obtaining the nominal object to be evaluated.

At step 325, a mesh may be generated from the measured target object (e.g., from the point cloud generated for the target object). The mesh may be generated using any mesh construction methods now known or later developed. In a nonlimiting example, the mesh may be generated by constructing the mesh using a Poisson reconstruction method. In another nonlimiting example, the mesh may be generating by feeding the point cloud data into a conversion software module, such as, but not limited to, MeshLab (Visual Computing Lab ISTI-CNR, Pisa, Italy), Inkscape, 3-Matic (Materialise NV, Leuven, Belgium), Magics (Materialise NV, Leuven, Belgium), and/or the like. The conversion software module then converts point cloud data into a mesh using one or more conversion algorithms.

It should be understood that the mesh includes a plurality of vertices, edges, and faces to model the shape of the imaged object. In some embodiments, at least one vertex of the mesh may represent a node for which a comparison is made, as described in greater detail herein. In some embodiments, the mesh may be a triangle mesh. However, it should be understood that other mesh shapes may also be used without departing from the scope of the present disclosure.

At step 330, the mesh from the measured target object may be overlaid on the nominal object. That is, various points on the mesh (e.g., the nodes of the mesh) are matched with corresponding points on the nominal object such that the mesh is appropriately aligned with the nominal object in a 3D space.

Once the mesh is appropriately aligned with the nominal object (e.g., overlaid on the nominal object), the mesh is then evaluated for errors (e.g., the various dimensional aspects of the mesh do not align with the nominal object) according to a plurality of criteria. That is, a determination is made at each of a plurality of nodes on the mesh as to the extent of the error (e.g., the amount of mismatch between the mesh and the nominal object) based on the plurality of criteria.

More specifically, at step 335, a node of the mesh is evaluated for one criterion of the plurality of criteria and at step 340, a determination is made as to whether additional criteria exist. If additional criteria exist, step 335 may be repeated. If no additional criteria exist (e.g., the node has been evaluated for all criteria), the process may proceed to step 345, where a weight is assigned to each criterion at that node. At step 350, a determination is made as to whether additional nodes exist. If additional nodes are to be analyzed, the process may return to step 335 for each additional node. If no additional nodes exist, the process may proceed to step 355.

Selection of the nodes for evaluation at step 335 is not limited by this disclosure. That is, any number of nodes may be selected, and may include nodes at any point on the mesh. The point on the mesh is not limited by this disclosure, and may be, for example, one of the plurality of vertices of the mesh and/or a point representing an area of interest. However, it should be understood that other points may also be selected without departing from the scope of the present disclosure.

Figure 4:
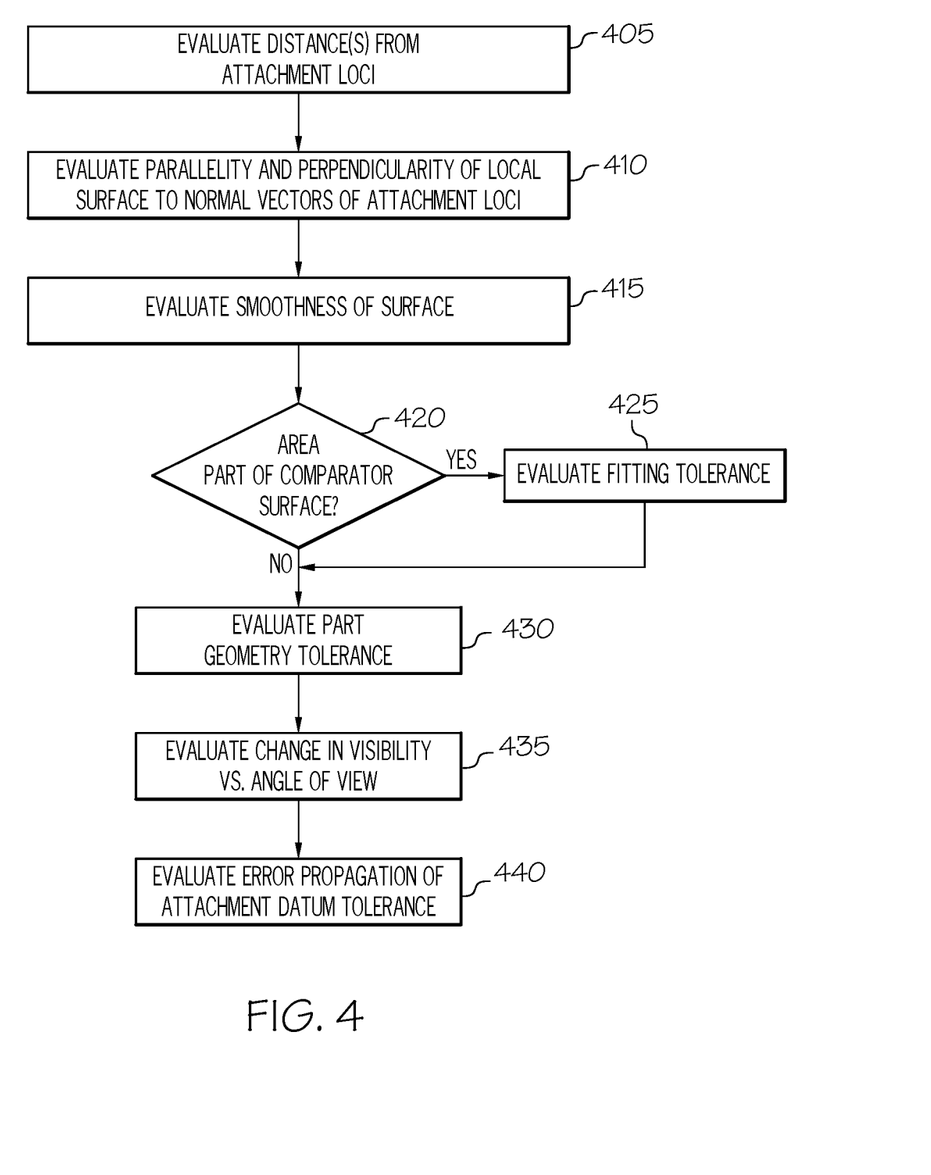
FIG. 4 depicts a flow diagram of an illustrative method of evaluating a node for a plurality of criteria according to one or more embodiments shown and described herein.

FIG. 4 depicts various illustrative criteria that may be considered for evaluating each node according to steps 335-350 of FIG. 3. The process depicted in FIG. 4 is merely provided for the purposes of describing illustrative criteria and can be completed in a plurality of different manners. For example, the processes depicted in FIG. 4 can be used within the context of steps 335 and 340 of FIG. 3. That is, each step described in FIG. 4 may be an equivalent of step 335 of FIG. 3, where step 340 of FIG. 3 is completed between each of the processes described in FIG. 4 until all requisite criteria have been evaluated. In addition, the various criteria described with respect to FIG. 4 are merely illustrative, and other criteria not specifically described in FIG. 4 may also be used. Moreover, fewer criteria than those described with respect to FIG. 4 may be used without departing from the scope of the present disclosure.

As shown in FIG. 4, at step 405, the node may be evaluated for a distance from at least one attachment locus. That is, if the target object is attached to an adjacent object, at least one first distance may be measured between the node and the point(s) of attachment to the adjacent object. In addition, at least one second distance may be measured between the corresponding point on the nominal object and the same point(s) of attachment. The first and second distance(s) are then compared to determine how the first distance(s) deviate from the second distance(s). As such, the evaluation according to step 405 includes a measured deviation from an expected distance to at least one attachment locus, including the amount of deviation (e.g., a distance or a percentage) and a direction of the deviation (e.g., in an x, y, and/or z direction). In some embodiments, the evaluation according to step 405 may further include a particular alteration (e.g., movement, reshaping, reconstruction, and/or the like) of the target object that would minimize or eliminate the deviation.

At step 410, the node may be evaluated for a parallelity and perpendicularity of a local surface to a normal vector extending from at least one attachment locus. As should be understood, a normal vector is a vector that extends perpendicularly from the surface at the attachment locus (e.g., the point on the target object that attaches to an adjacent object). The evaluation according to step 410 may include first determining whether the slope of the surface on the nominal object at the point corresponding to the node is perpendicular to or parallel to the normal vector of the selected attachment locus. If the slope is not parallel or perpendicular, a determination may be made as to how much it deviates from being parallel and/or perpendicular. A comparison is then made with the parallelity or perpendicularity of the slope of the surface of the mesh at the node with respect to the same normal vector to determine how the mesh surface slope differs from the nominal object surface slope.

At step 415, a smoothness of a surface of the mesh may be evaluated relative to the smoothness of the surface of the nominal object at a particular node or between a plurality of nodes. That is, if the nominal object has a surface that is entirely flat between two points, the mesh should also have an entirely flat surface between the two nodes that correspond to the two points. If the mesh does not have an entirely flat surface, the difference between the two surfaces may be noted, including where the deviation exists and the nature of the deviation.

At step 420, a determination may be made as to whether a particular surface on the target object is a comparator surface or a portion of a comparator surface. That is, the determination is made as to whether the particular surface is used for the purposes of measuring or verifying an expected surface finish of an overall product.

If the particular surface is a comparator surface or a portion of a comparator surface, a fitting tolerance of the surface may be evaluated at step 425. That is, the surface may be evaluated to ensure it accurately corresponds to the same surface on the nominal object. For example, the evaluation may account for a curvature of the surface at the node and the corresponding point on the nominal object. The curvature of the target object can be determined using the data from the mesh. In a nonlimiting example, the curvature for both the target object surface and the nominal object surface may be determined by determining the normal vector slope of the node and the corresponding point on the nominal object, determining a local second order derivative (e.g., a second derivative) of the node and the corresponding point on the nominal object, and determining a local third order derivative (e.g., a third derivative) of the node and the corresponding point on the nominal object.

Determining the normal vector slope includes determining (e.g., calculating) a slope of a vector that extends perpendicularly from the surface of the mesh (and thus the imaged target object) at a specific node that was selected. More specifically, the normal vector (also referred to as a "normal") is a vector that extends perpendicularly from the tangent plane of the surface of the mesh (and the target object) at the node. As should be understood, determining the slope of the normal vector includes calculating the derivative of a function for the normal vector. That is, a function of y=f(x) has a derivative with the notation $$\frac{dy}{dx}.$$

Determining the local second order derivative includes determining (e.g., calculating) a derivative of the derivative of the function for the normal vector. Continuing from the example provided above, it should be understood that a function of y=f(x) has a second order derivative with the notation $$\frac{d^2y}{dx^2}.$$

As a result of calculating the local second order derivative, a rate of change of the slope of the vector that extends perpendicularly from the node may be provided.

Determining the local third order derivative includes determining (e.g., calculating) a derivative of the derivative of the derivative of the function for the normal vector. Continuing from the examples provided above, it should be understood that a function of y=f(x) has a third order derivative with the notation $$\frac{d^3y}{dx^3}.$$

As a result of determining the local third order derivative, a rate of change of the rate of change of the slope of the vector that extends perpendicularly from the node may be provided. As a result, the torsion of the curve (e.g., the fundamental property of the curve in three dimensions) of the surface of the target object is determined, which, in turn, accurately defines an angle of curvature of the target object at the node.

Similar calculations are then completed for the nominal object. As described above, determining the curvature of the corresponding point on the nominal object includes determining the normal vector slope of the point, determining a local second order derivative (e.g., a second derivative) of the point, and determining a local third order derivative (e.g., a third derivative) of the point.

An error is determined when a difference exists between the normal vector slope, the second order derivative, and the third order derivative for each node on the mesh when compared to a corresponding point on the nominal object (e.g., an error between the angle of curvature at the node on the target object with a corresponding point on the nominal part generated from the reference data). That is, a presumption is made that the normal vector slope, the second order derivative, and the third order derivative of a particular point on the nominal object is correct, and the determination is made as to how much the normal vector slope, the second order derivative, and the third order derivative of a corresponding node on the mesh differ from those on the nominal object (if any). The difference may be expressed, for example, as a numerical amount (e.g., the normal vector slope differs by 0.1) and/or a percentage amount (e.g., the normal vector slope differs by 0.05%).

At step 430, a geometry tolerance of the target object is evaluated. That is, any error that is detected via any of the evaluation steps described herein with respect to FIG. 4 is evaluated for whether it falls within an acceptable threshold. As such, the error can be determined to be either within or outside a threshold amount of error. For example, if a threshold is established whereby a 0.05% difference is acceptable, any error that is less than or equal to 0.05% (e.g., within the threshold) may be considered to be acceptable, whereas any error greater than 0.05% (e.g., outside the threshold) is unacceptable. It should be understood that the percentages described above are merely illustrative, and the threshold may be represented by other percentages or numbers without departing from the scope of the present disclosure.

In some embodiments, geometry tolerance may be based on a plurality of factors as a whole. For example, if a node is within a tolerance for three of the above-mentioned evaluations but outside a tolerance for a fourth of the above-mentioned evaluation, the geometry tolerance evaluation according to step 430 in general may be that the target object is not within an acceptable tolerance.

At step 435, a change in visibility versus an angle of view is evaluated. That is, an evaluation may be made as to whether a particular node, when observed at a first angle relative to the node, is different when the same node is observed at a second angle relative to the node that is different from the first angle. Furthermore, the evaluation may compare whether the change in perception of the node corresponds to a change in perception of the corresponding point on the nominal object. For example, if the node corresponds to a point on a class A surface of the target object and a user stands at a location where the point can be observed, the evaluation may include determining whether the observer's perception of the point changes when the observer moves relative to the target object. In some embodiments, it may be desirable to ensure the observer's perception does not change as he/she moves relative to the point observed. In other embodiments, it may be desirable to ensure the observer's perception does change as he/she moves relative to the point observed.

In some embodiments, attachment of a datum to the target object may cause an error on the target object relative to the nominal object. Thus, at step 440, a tolerance of any error that is propagated to the point on the target object that corresponds to the node due to the datum may be evaluated. That is, a determination may be made as to whether the error is outside a tolerance, which may be, for example, similar to the tolerance described herein with respect to step 425.

Referring again to FIG. 3, once all of the criteria have been evaluated for a particular node (e.g., a criteria value is obtained for each criterion), a weight may assigned to each criterion at step 345 to obtain a weighted criteria value. The weight can be based on any factor, and is not limited by this disclosure. In some embodiments, the weight may vary based on the type of target object (e.g., type of manufactured part, location of manufactured part, other objects the manufactured part is adjacent to, and/or the like). For example, embodiments where the target object is a dashboard panel may put a greater emphasis on certain criteria that are different than the criteria that are emphasized in embodiments where the target object is a door panel. In some embodiments, the weight may be based on certain aesthetic preferences, such as aesthetic preferences of a designer, an engineer, a consensus result of a focus group, and/or the like. For example, a focus group study may indicate that a particular curvature of a manufactured part or a particular gap between the manufactured part and an adjacent object is more aesthetically pleasing than an alternative. As such, the criteria that directly relate to the particular curvature or the particular gap may be weighted as having a greater importance than other criteria not directly related to the particular curvature or the particular gap.

Weighting a criteria value according to step 345 may include, but is not limited to, annotating the criteria value with a weight, assigning a numerical value to the criteria value and factoring a weight that is also expressed as a numerical value, and/or the like. For example, the criteria values that result from evaluation of the node may be assigned a particular number, such as a number on a scale of 1 to 5. In addition, weights may be assigned on a scale of 0.1 to 1.0. The weighted criteria value for each criterion may be the number of the criteria value times the weight value (e.g., a criteria value of 5 and a weight value of 0.8 would have a weighted criteria value of 4). It should be understood that the weighting described herein is merely illustrative, and other methods of establishing a criteria value and a weighted criteria are included within the scope of the present disclosure.

At step 350, a determination is made as to whether additional nodes exist for which criteria are to be evaluated. If so, the process may repeat at step 335 for each additional node. Otherwise, the process proceeds to step 365.

At step 355, a color map is generated for each weighted criteria value at the evaluated nodes. As such, a color map (or any other visualizable representation) may depict the target object (or the mesh) and may further indicate, at each location that was evaluated, the amount of error that was detected according to a particular criterion. As such, areas having a greater amount of error will be indicated relative to areas having a lesser amount of error by varying the color between the areas. That is, a black color may indicate the highest amount of error, whereas a white color may indicate the lowest amount of error or no error. Areas falling between the two extremes will be a particular shade of grey, depending on the amount of error that exists. Step 355 is completed such that a new color map is generated for each of the criteria that were evaluated at step 335 and described with respect to FIG. 4 and the number of color maps corresponds to the number of criteria that were evaluated. In a nonlimiting example, if four criteria were evaluated at step 355, then four color maps are generated.

At step 360, all of the generated color maps may be combined into a combined color map (e.g., a combined visualizable representation). The combined color map may be generated so as to account for the various weights assigned to each criterion. As such, the combined color map distinguishes between areas having higher weighted criteria than areas having lower weighted criteria. For example, if a first node indicated on the color map has the same amount of deviation as a second node, but the second node has been assigned a greater weight, the second node will be distinguished as having a "more important" deviation than the first node, which may be indicated, for example, as having a darker color than the color shown at the first node. As such, when viewing the color map, it may become apparent which nodes contain the greatest deviation and/or importance relative to other areas having lower deviation and/or importance. Therefore, an individual or computer program can utilize the color map in making decisions as to which areas of the target object are in need of modification to ensure an appropriate fit to the corresponding target object.

Accordingly, it should now be understood that the systems and methods described herein can image a target object and compare it to a corresponding nominal object, evaluate the various errors that exist between the target object and the nominal object and assign weights according to importance, and generate a color map indicating the errors and the degree of their importance. As a result, the color map can be used to accurately determine how to modify the target object to appropriately represent the nominal object, which can result in surfaces, particularly class A surfaces, that are more aesthetically pleasing and/or are better aligned with adjacent objects.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of providing a combined visualizable representation for evaluating a target object, the method comprising:
generating, by a processing device, a mesh corresponding to one or more measurements for the target object, wherein the mesh comprises a plurality of nodes;
overlaying, by the processing device, the mesh on a nominal object created from reference data, wherein the reference data is representative of one or more expected dimensions of the target object;
evaluating, by the processing device, each node of the plurality of nodes for a plurality of criteria to obtain a plurality of criteria values, wherein each criterion of the plurality of criteria is an expression of an amount of error between each node and a corresponding point on the nominal object;
assigning, by the processing device, a weighted value to each of the plurality of criteria values to obtain a plurality of weighted criteria values, wherein the weighted value is based on one or more factors, the one or more factors comprising a type of target object and an aesthetic preference;
generating, by the processing device, a visualizable representation of each weighted criteria value of the plurality of weighted criteria values to obtain a plurality of visualizable representations;
combining, by the processing device, each one of the plurality of visualizable representations into the combined visualizable representation, wherein the combined visualizable representation indicates each one of the plurality of weighted criteria values; and
providing, by the processing device, the combined visualizable representation to an external device, the combined visualizable representation providing information relating to one or more areas of the target object that are in need of modification.

2. The method of claim 1, wherein evaluating each node of the plurality of nodes for the plurality of criteria comprises at least one of:
evaluating a distance from a particular node of the plurality of nodes to at least one attachment locus;
evaluating a parallelity of a local surface of the particular node to a normal vector of the at least one attachment locus;
evaluating a perpendicularity of the local surface of the particular node to the normal vector of the at least one attachment locus;
evaluating a smoothness of a surface of the target object at the particular node;
evaluating a fitting tolerance of the target object at the particular node as part of a comparator surface a part geometry tolerance;
evaluating a change in visibility versus an angle of view at the particular node; and
evaluating an error propagation of an attachment datum tolerance at the particular node.

3. The method of claim 1, further comprising:
measuring, by the processing device, the target object to obtain the one or more measurements.

4. The method of claim 1, further comprising:
obtaining, by the processing device, the reference data; and
generating, by the processing device, the nominal object from the reference data.

5. The method of claim 1, wherein each one of the plurality of visualizable representations is a color map.

6. The method of claim 1, wherein the combined visualizable representation is a color map.

7. The method of claim 6, wherein the color map indicates one or more first areas of the target object that are easier to modify than one or more second areas of the target object.

8. The method of claim 1, wherein the target object is a manufactured part.

9. A system of providing a combined visualizable representation for evaluating a target object, the system comprising:
a processing device; and
a non-transitory, processor-readable storage medium, the non-transitory, processor-readable storage medium comprising one or more programming instructions that, when executed, cause the processing device to:
generate a mesh corresponding to one or more measurements for the target object, wherein the mesh comprises a plurality of nodes,
overlay the mesh on a nominal object created from reference data, wherein the reference data is representative of one or more expected dimensions of the target object,
evaluate each node of the plurality of nodes for a plurality of criteria to obtain a plurality of criteria values, wherein each criterion of the plurality of criteria is an expression of an amount of error between each node and a corresponding point on the nominal object,
assign a weighted value to each of the plurality of criteria values to obtain a plurality of weighted criteria values, wherein the weighted value is based on one or more factors, the one or more factors comprising a type of target object and an aesthetic preference,
generate a visualizable representation of each weighted criteria value of the plurality of weighted criteria values to obtain a plurality of visualizable representations,
combine each one of the plurality of visualizable representations into a combined visualizable representation, wherein the combined visualizable representation indicates each one of the plurality of weighted criteria values, and
provide the combine visualizable representation to an external device, the combined visualizable representation providing information relating to one or more areas of the target object that are in need of modification.

10. The system of claim 9, wherein the one or more programming instructions that, when executed, cause the processing device to evaluate each node of the plurality of nodes for the plurality of criteria further cause the processing device to evaluate at least one of:
a distance from a particular node of the plurality of nodes to at least one attachment locus;
a parallelity of a local surface of the particular node to a normal vector of the at least one attachment locus;
a perpendicularity of the local surface of the particular node to the normal vector of the at least one attachment locus;
a smoothness of a surface of the target object at the particular node;
a fitting tolerance of the target object at the particular node as part of a comparator surface a part geometry tolerance;
a change in visibility versus an angle of view at the particular node; and an error propagation of an attachment datum tolerance at the particular node.

11. The system of claim 9, wherein the non-transitory, processor-readable storage medium further comprises one or more programming instructions that, when executed, cause the processing device to:
 measure the target object to obtain the one or more measurements.

12. The system of claim 9, wherein the non-transitory, processor-readable storage medium further comprises one or more programming instructions that, when executed, cause the processing device to:
 obtain the reference data; and
 generate the nominal object from the reference data.

13. The system of claim 9, wherein each one of the plurality of visualizable representations is a color map.

14. The system of claim 9, wherein the combined visualizable representation is a color map.

15. The system of claim 14, wherein the color map indicates one or more first areas of the target object that are easier to modify than one or more second areas of the target object.

16. The system of claim 9, wherein the target object is a manufactured part.

17. A system of providing a combined color map for evaluating a target object, the system comprising:
 a measuring device;
 a processing device communicatively coupled to the measuring device; and
 a non-transitory, processor-readable storage medium, the non-transitory, processor-readable storage medium comprising one or more programming instructions that, when executed, cause the processing device to:
  direct the measuring device to obtain one or more measurements for the target object,
  generate a mesh corresponding to the one or more measurements for the target object, wherein the mesh comprises a plurality of nodes,
  receive reference data representative of one or more expected dimensions of the target object,
  generate a nominal object from the reference data,
  overlay the mesh on the nominal object,
  evaluate each node of the plurality of nodes for a plurality of criteria to obtain a plurality of criteria values, wherein each criterion of the plurality of criteria is an expression of an amount of error between each node and a corresponding point on the nominal object,
  assign a weighted value to each of the plurality of criteria values to obtain a plurality of weighted criteria values, wherein the weighted value is based on one or more factors, the one or more factors comprising a type of target object and an aesthetic preference,
  generate a color map of each weighted criteria value of the plurality of weighted criteria values to obtain a plurality of color maps,
  combine each one of the plurality of color maps into the combined color map, wherein the combined color map indicates each one of the plurality of weighted criteria values,
  provide the combined color map to an external device, the combined color map providing information relating to one or more areas of the target object that are in need of modification.

18. The system of claim 17, wherein:
 the measuring device is a three dimensional (3D) scanner configured to measure the target object and generate a point cloud representing the target object; and
 the one or more programming instructions that, when executed, cause the processing device to generate the mesh further cause the processing device to:
 receive the point cloud from the 3D scanner, and
 generate the mesh from the point cloud.

* * * * *